(12) United States Patent
Poder

(10) Patent No.: US 9,365,187 B2
(45) Date of Patent: *Jun. 14, 2016

(54) SECURITY SYSTEM

(71) Applicant: COMCAST CABLE COMMUNICATIONS, LLC, Philadelphia, PA (US)

(72) Inventor: Jim Poder, Cheltenham, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/621,713

(22) Filed: Feb. 13, 2015

(65) Prior Publication Data

US 2015/0224963 A1 Aug. 13, 2015

Related U.S. Application Data

(63) Continuation of application No. 13/341,493, filed on Dec. 30, 2011, now Pat. No. 8,988,205.

(60) Provisional application No. 61/428,589, filed on Dec. 30, 2010, provisional application No. 61/428,603, filed on Dec. 30, 2010, provisional application No. 61/428,594, filed on Dec. 30, 2010.

(51) Int. Cl.
*B60R 25/10* (2013.01)
*B60R 25/102* (2013.01)
*G08B 25/00* (2006.01)
*G08B 25/14* (2006.01)
*G08B 25/10* (2006.01)

(52) U.S. Cl.
CPC ............ *B60R 25/102* (2013.01); *G08B 25/008* (2013.01); *G08B 25/10* (2013.01); *G08B 25/14* (2013.01)

(58) Field of Classification Search
CPC .... B60K 25/102; G08B 25/008; G08B 25/14; B60R 25/102; B60R 2025/1013; H04W 48/16; H04W 72/08; H04W 84/18
See application file for complete search history.

(56) References Cited

U.S. PATENT DOCUMENTS

| 4,987,406 | A | 1/1991 | Reid |
| 5,543,778 | A | 8/1996 | Stouffer |
| 6,067,007 | A | 5/2000 | Gioia |
| 6,160,319 | A | 12/2000 | Marougi et al. |
| 6,549,130 | B1 | 4/2003 | Joao |
| 2005/0128068 | A1 | 6/2005 | Winick et al. |
| 2010/0164719 | A1 | 7/2010 | George et al. |
| 2011/0032913 | A1* | 2/2011 | Patil ............... H04W 72/08 370/338 |
| 2011/0084831 | A1 | 4/2011 | Tran |
| 2011/0193700 | A1 | 8/2011 | Fitzgibbon et al. |
| 2012/0163352 | A1* | 6/2012 | Bansal ............... H04L 41/0823 370/338 |

* cited by examiner

*Primary Examiner* — George Bugg
*Assistant Examiner* — Renee Dorsey
(74) *Attorney, Agent, or Firm* — Banner & Witcoff, Ltd.

(57) ABSTRACT

Methods, systems, computer-readable media, and apparatuses for expanding the functionality of a security system are disclosed. The security system may be integrated with a vehicle security system. For example, a vehicle security node of a vehicle may transmit a signal that may be received by the security system. The security system may authenticate the vehicle security node and integrate the vehicle security node into its network. Various information may be communicated in both directions between the security system and the vehicle security node. The vehicle security node may communicate with an alarm panel that may include a dock for connecting a portable device.

21 Claims, 8 Drawing Sheets

SECURITY SYSTEM

CROSS REFERENCE TO RELATED APPLICATIONS

The present application is a continuation of U.S. Nonprovisional application Ser. No. 13/341,493, filed Dec. 30, 2011, which claims priority to U.S. Provisional Application No. 61/428,589, filed Dec. 30, 2010 and entitled "Home Security System User Devices," U.S. Provisional Application No. 61/428,603, filed Dec. 30, 2010 and entitled "Home Security System Access And Control," and U.S. Provisional Application No. 61/428,594, filed Dec. 30, 2010 and entitled "Home Security System Infrastructure." The contents of all of these prior applications hereby incorporated by reference in their entireties.

BACKGROUND

The present disclosure relates generally to security systems.

Electronic security systems are a popular way of securing and monitoring property. More and more homes, businesses, and other structures have premises security systems. Security systems are also found in automobiles. While security systems have been useful for detecting certain types of intrusions or attempted thefts, there remains an ever-present need to improve their coverage ability and convenience of use.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Some aspects of this disclosure relate to extending a premises security system to communicate with a vehicle. For example, by using one or more aspects of the disclosure, a security system user, such as a caretaker, business owner, or homeowner, may be able to integrate their vehicle's alarm system and their main premises security system. In one arrangement, the security system may receive a signal transmitted from a vehicle security node. The security system may authenticate the vehicle security node and the alarm system of the vehicle may be integrated with the security system. Thus, information may be exchanged in both directions between the security system and the vehicle security node.

In another aspect of this disclosure, the premises security system may include an alarm panel that includes a dock having a keypad and an adapter. The adapter allows a portable device to connect to the dock. When connected to the dock, the portable device may obscure the keypad of the dock, and may launch a security system application and display a keypad on its own or a remote screen, allowing the portable device to serve as the home security interface.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

Figure 1:
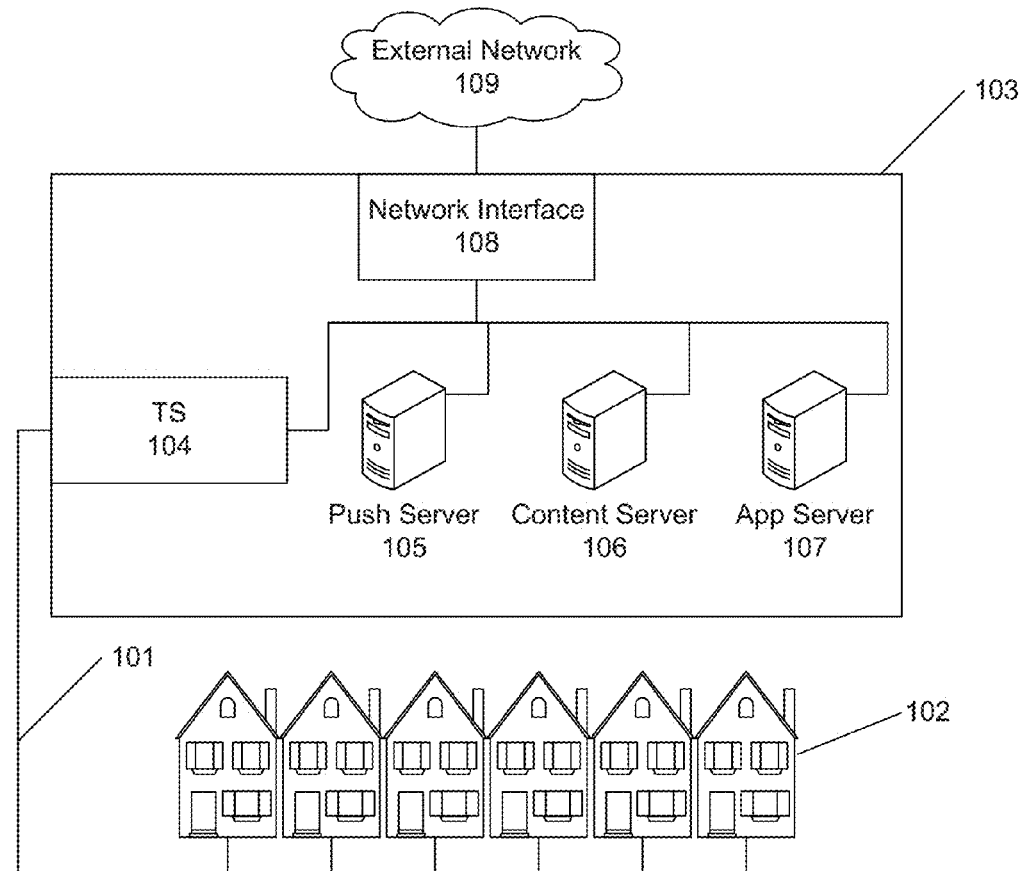
FIG. 1 illustrates an example communication network according to one or more aspects described herein.
Figure 1:
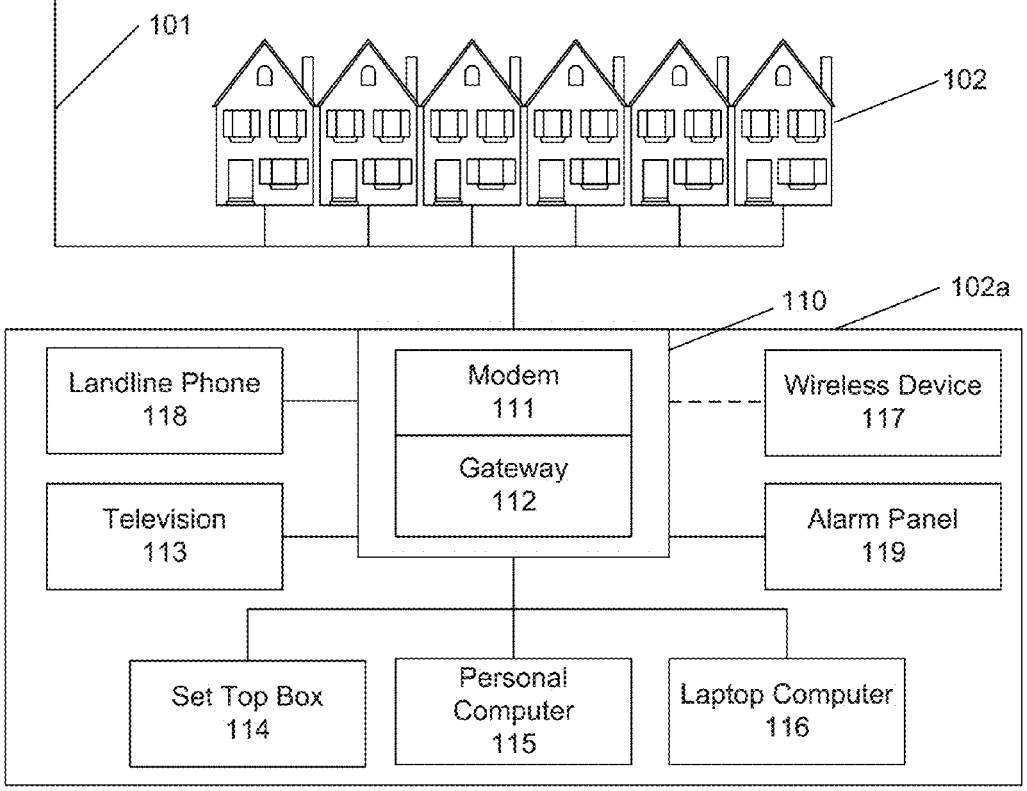

FIG. 1 illustrates an example network 100 on which many of the various features described herein may be implemented. Network 100 may be, for example, any type of information distribution network, such as satellite, telephone, cellular, wireless, etc. One example may be an optical fiber network, a coaxial cable network, or a hybrid fiber/coax distribution network. Such networks 100 use a series of interconnected communication links 101 (e.g., coaxial cables, optical fibers, wireless, etc.) to connect multiple premises 102 (e.g., businesses, homes, consumer dwellings, etc.) to a local office or headend 103. The local office 103 may transmit downstream information signals onto the links 101, and each premises 102 may have a receiver used to receive and process those signals.

There may be one link 101 originating from the local office 103, and it may be split a number of times to distribute the signal to various premises 102 in the vicinity (which may be many miles) of the local office 103. The links 101 may include components not illustrated, such as splitters, filters, amplifiers, etc. to help convey the signal clearly, but in general each split introduces a bit of signal degradation. Portions of the links 101 may also be implemented with fiber-optic cable, while other portions may be implemented with coaxial cable, other lines, or wireless communication paths.

The local office 103 may include an interface, such as a termination system (TS) 104. In one example, the interface 104 may be a cable modem termination system (CMTS), which may be a computing device configured to manage communications between devices on the network of links 101 and backend devices such as servers 105-107 (to be discussed further below). The interface 104 may be as specified in a standard, such as the Data Over Cable Service Interface Specification (DOCSIS) standard, published by Cable Television Laboratories, Inc. (a.k.a. CableLabs), or it may be a similar or modified device instead. The interface 104 may be configured to place data on one or more downstream frequencies to be received by modems at the various premises 102, and to receive upstream communications from those modems on one or more upstream frequencies.

The local office 103 may also include one or more network interfaces 108, which can permit the local office 103 to communicate with various other external networks 109. These networks 109 may include, for example, networks of Internet devices, telephone networks, cellular telephone networks, fiber optic networks, local wireless networks (e.g., WiMAX), satellite networks, and any other desired network, and the network interface 108 may include the corresponding circuitry needed to communicate on the external networks 109, and to other devices on the network such as a cellular telephone network and its corresponding cell phones.

As noted above, the local office 103 may include a variety of computing devices, such as servers 105-107 that may be configured to perform various functions. For example, the local office 103 may include a push notification server 105. The push notification server 105 may generate push notifications to deliver data and/or commands to the various premises 102 in the network (or more specifically, to the devices in the premises 102 that are configured to detect such notifications). The local office 103 may also include a content server 106. The content server 106 may be one or more computing devices that are configured to provide content to users at their premises. This content may be, for example, video on demand movies, television programs, songs, text listings, etc. The content server 106 may include software to validate user identities and entitlements, to locate and retrieve requested content, to encrypt the content, and to initiate delivery (e.g., streaming) of the content to the requesting user and/or device.

The local office 103 may also include one or more application servers 107. An application server 107 may be a computing device configured to offer any desired service, and may run various languages and operating systems (e.g., servlets and JSP pages running on Tomcat/MySQL, OSX, BSD, Ubuntu, Redhat, HTML5, JavaScript, AJAX and COMET). For example, an application server may be responsible for collecting television program listings information and generating a data download for electronic program guide listings. Another application server may be responsible for monitoring user viewing habits and collecting that information for use in selecting advertisements. Still, another application server may be responsible for receiving and transmitting communications related to a security system in accordance with the present disclosure. Although shown separately, one of ordinary skill in the art will appreciate that the push server 105, content server 106, and application server 107 may be combined. Further, here the push server 105, content server 106, and application server 107 are shown generally, and it will be understood that they may each contain memory storing computer executable instructions to cause a processor to perform steps described herein and/or memory for storing data collected, such as security system settings, vehicle security node profiles, user and/or vehicle schedules, and alarm event logs, as a result of performing steps described herein.

An example premises 102a, such as a home, may include an interface 110. For example, the interface 110 may include a modem 111, which may include transmitters and receivers used to communicate on the links 101 and with the local office 103. The modem 111 may be, for example, a coaxial cable modem (for coaxial cable lines 101), a fiber interface node (for fiber optic lines 101), or any other desired modem device. Also, although only one modem is shown in FIG. 1, a plurality of modems operating in parallel may be implemented within the interface 110. Further, the interface 110 may include a gateway interface device 112. The modem 111 may be connected to, or be a part of, the gateway interface device 112. The gateway interface device 112 may be a computing device that communicates with the modem(s) 111 to allow one or more other devices in the premises 102a, to communicate with the local office 103 and other devices beyond the local office 103. The gateway 112 may be a set-top box (STB), digital video recorder (DVR), computer server and/or router, or any other desired computing device. The gateway 112 may also include (not shown) local network interfaces to provide communication signals to requesting entities/devices in the premises 102a, such as televisions 113, additional STBs 114, personal computers 115, laptop computers 116, wireless devices 117 (e.g., wireless routers, wireless laptops, notebooks, tablets and netbooks, cordless phones (e.g., Digital Enhanced Cordless Telephone—DECT phones), mobile phones, mobile televisions, personal digital assistants (PDA), etc.), landline phones 118, an alarm panel 119, and any other desired devices. Examples of the local network interfaces include Multimedia Over Coax Alliance (MoCA) interfaces, Ethernet interfaces, universal serial bus (USB) interfaces, wireless interfaces (e.g., IEEE 802.11, IEEE 802.16), analog twisted pair interfaces, Bluetooth interfaces, and others.

Figure 2:
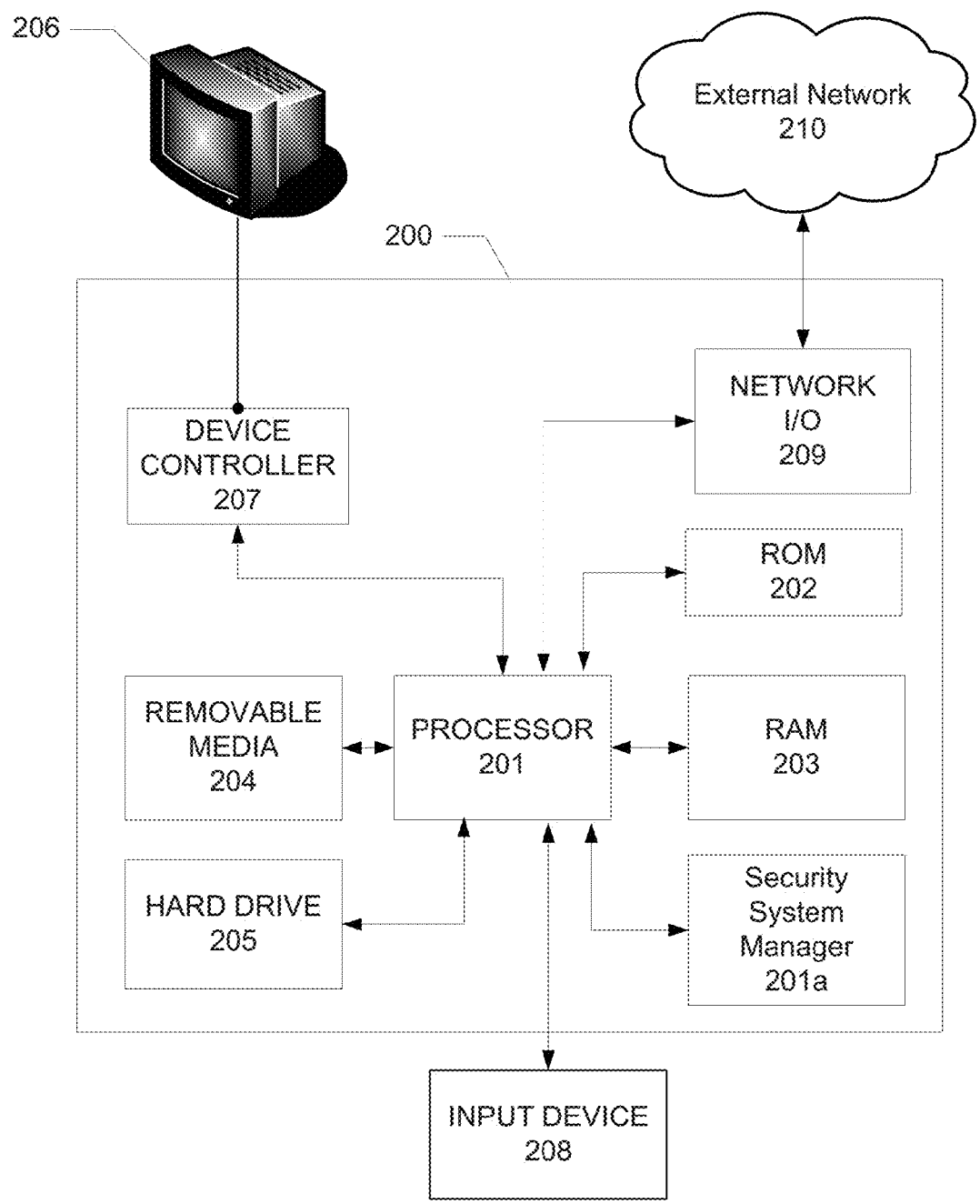
FIG. 2 illustrates an example computing device according to one or more aspects described herein.

FIG. 2 illustrates general hardware elements that can be used to implement any of the various computing devices discussed herein. The computing device 200 may include one or more processors 201, which may execute instructions of a computer program to perform any of the features described herein. The instructions may be stored in any type of computer-readable medium or memory, to configure the operation of the processor 201. For example, instructions may be stored in a read-only memory (ROM) 202, random access memory (RAM) 203, removable media 204, such as a Universal Serial Bus (USB) drive, compact disk (CD) or digital versatile disk (DVD), floppy disk drive, or any other desired storage medium. Instructions may also be stored in an attached (or internal) hard drive 205. The computing device 200 may include one or more output devices, such as a display 206 (e.g., an external television), and may include one or more output device controllers 207, such as a video processor. There may also be one or more user input devices 208, such as a remote control, keyboard, mouse, touch screen, microphone, etc. The computing device 200 may also include one or more network interfaces, such as a network input/output (I/O) circuit 209 (e.g., a network card) to communicate with an external network 210. The network input/output circuit 209 may be a wired interface, wireless interface, or a combination of the two. In some embodiments, the network input/output circuit 209 may include a modem (e.g., a cable modem), and the external network 210 may include the communication links 101 discussed above, the external network 109 discussed above, an in-home network, a provider's wireless, coaxial, fiber, or hybrid fiber/coaxial distribution system (e.g., a DOCSIS network), or any other desired network.

The FIG. 2 example is a hardware configuration. Modifications may be made to add, remove, combine, divide, etc. components of the computing device 200 as desired. Additionally, the components illustrated may be implemented using basic computing devices and components, and the same components (e.g., processor 201, ROM storage 202, display 206, etc.) may be used to implement any of the other computing devices and components described herein. For example, the various components herein may be implemented using computing devices having components such as a processor executing computer-executable instructions stored on a computer-readable medium, as illustrated in FIG. 2. Some or all of the entities described herein may be software based, and may co-exist in a common physical platform (e.g., a requesting entity can be a separate software process and program from a dependent entity, both of which may be executed as software on a common computing device). Additionally, for the security system described herein, the computing device 200 may include a security system manager

201a, which can perform the various security functions described herein as a replacement for, or augment to, any other processor 201 that the computing device 200 may include. That is, the security system manager 201a may include a separate set of computer-executable instructions stored on a computer-readable medium that, when executed by a processor (e.g., processor 201), cause the processor (or the computing device 200 as a whole) to perform the various security functions described herein. The security system manager 201a may also include internal secure memory (not shown), which can store the various security settings, vehicle security node settings, profiles, alarm event logs, and computer-executable instructions for performing security system processes, such as registering sensors, registering vehicle security nodes, communicating with vehicle security nodes, detecting alarm events, reacting to alarm events, and communicating alarm events over external networks described herein. The internal memory can be any desired type of memory, and can have enhanced security features to help restrict access (e.g., can only be accessed by the security system manager 201a). Where the security system manager 201a includes a separate set of computer-executable instructions, these instructions may be secured such that only authorized users (e.g., those providing a password) may be allowed to modify, augment, or delete them.

In some embodiments, the security system manager 201a may be implemented as an application specific integrated circuit (ASIC). That is, the security system manager 201a may be a chip designed specifically for performing the various security functions described herein. Further, the ASIC may be implemented within or in communication with various computing devices provided herein.

One or more aspects of the disclosure may be embodied in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device. The computer executable instructions may be stored on one or more computer readable media such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

Figure 3:
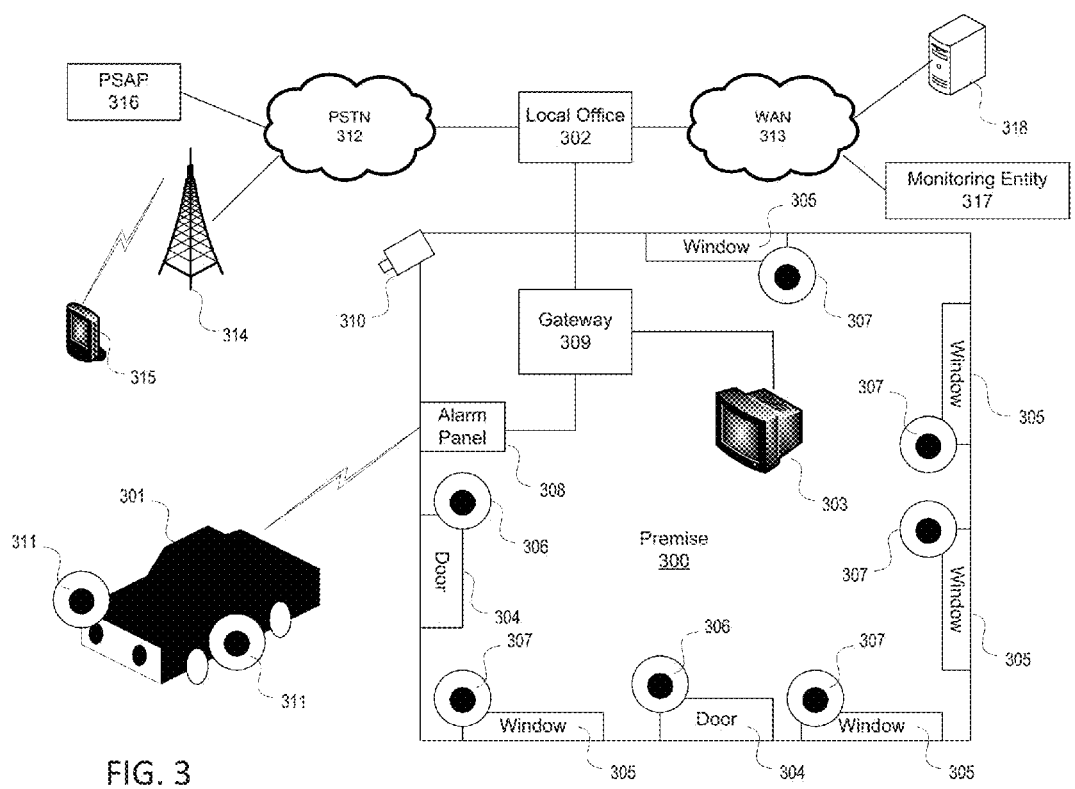
FIG. 3 illustrates a diagram of an example operating environment according to one or more aspects described herein.

FIG. 3 is a diagram showing an example operating environment in which various features described herein may be performed and implemented. The environment may include a premises 300 (which may correspond to the premises 102 of FIG. 1), such as a user residence, business, recreational facility, etc. (referred to herein as a user residence or premises in a non-limiting manner), a vehicle 301, and a local office 302 (which may correspond to the local office 103 of FIG. 1). One or more properties located on the premises 300, such as a television 303, may be secured according to one or more aspects described herein. The premises 300 may include one or more doors 304 and a plurality of windows 305. The doors 304 may be secured by an associated door security sensor 306 (e.g., a proximity sensor, contact switch, motion detector, etc.). In addition, each of the plurality of windows 305 may be secured by associated window security sensors 307, which may be similar to the door security sensor 306. The security sensors 306 and 307 may be communicatively coupled to an alarm panel 308, which may allow the security sensors 306 and 307 to be armed, disarmed, and monitored. For instance, a user may operate alarm panel 308 to arm security sensors 306, such that if a door 304 is opened while the associated security sensor 306 is armed, an alarm will be triggered. Herein, triggering an alarm may result in various actions, for example, playing an alarm sound, presenting an alarm message, turning on/off lights, turning on cameras, etc. In one arrangement, the alarm panel 308 may be implemented in and/or as part of gateway 309. Thus, in one example, gateway 309 may be communicatively coupled to security sensors 306 and 307, which may allow gateway 309 to arm, disarm, and/or monitor the security sensors 306 and 307. While the description above focuses on door security sensors 306 and window security sensors 307, many other security sensors and devices may be communicatively coupled to the alarm panel 308 and/or gateway 309. For example, the alarm panel 308 may be communicatively coupled to one or more cameras 310, which may record video to monitor the premises 300 and surrounding area.

Further, as shown in FIG. 3, the alarm panel 308 and/or gateway 309 may be communicatively coupled to a mobile security node (not shown) within the vehicle 301. In the examples throughout this disclosure, when attached to the vehicle 301, the mobile security node may be referred to as a vehicle security node. The vehicle 301 may be any type of vehicle, including an automobile (e.g., car, truck, bus, etc.), watercraft, recreational vehicle (R/V), motorcycle, bicycle, aircraft, etc. In some embodiments, the vehicle 301 may have an existing alarm system (e.g., a car alarm system). The vehicle 301 may have been manufactured with the alarm system or it may have been installed thereafter. Such vehicle alarm systems may be capable of detecting impact, glass breaking, door/window opening, vibrations, and/or nearby movement. In addition, the vehicle 301 may be outfitted with specially designed vehicle sensors 311 for use with a security system in accordance with the present disclosure. In particular, the vehicle sensors 311 may be designed or later adapted to communicate with the alarm panel 308 and/or gateway 309 via the vehicle security node. In one or more arrangements, the vehicle sensors 311 may be integrated with the vehicle security node. That is, the vehicle security node may act as a vehicle sensor 311. Although FIG. 3 shows only one vehicle 301, a plurality of vehicles 301 may communicate simultaneously with the alarm panel 308 and/or gateway 309.

The mobile security node or vehicle security node can be implemented as a computing device, and can be a dedicated security device akin to a traditional car alarm and computing systems. Alternatively, the mobile security node can be implemented as any other portable computing device, such as a smartphone, tablet, house key, etc. As mentioned above, the mobile security node may be referred to as a vehicle security node for clarity. However, use of the term "vehicle security node" should be interpreted in a non-limiting manner, and where reference is made to a vehicle, vehicle security node, and vehicle sensors, the functions and features of these elements may be similarly implemented with a mobile device (e.g., a smartphone, tablet, house key, etc.), a mobile security node, and sensors designed/adapted for a mobile device. Therefore, where a mobile security node is implemented on, for example, a smartphone, an alarm system of the smartphone may be integrated with the security system of the premises 300 when the mobile security node is in range of the security system.

From the example diagram of FIG. 3, various features may be realized. For example, the security sensors 306 and 307, vehicle sensors 311, mobile security nodes, cameras 310, alarm panel 308, and gateway 309 may be communicatively coupled to a user interface device, such as the television 303 (or another type of display). Through the user interface device (e.g., the television 303) an authorized user may configure any of the devices within the security system. Another example feature may include transmitting (e.g., streaming) data (e.g., pictures, video, audio, etc.) from one or more cameras 310 to any of the other devices in the diagram of FIG. 3.

FIG. 3 also shows that the gateway 309 may communicate with an external network, such as the local office 302. Thus, the gateway 309 may transfer alert signals indicating detected alarm events upstream to the local office 302. This may be particularly desired to counter "smash and grab" scenarios in which an intruder smashes devices of the security system (e.g., alarm panel 308, camera 310, security sensors 306 and 307, etc.) in hopes of disabling the alarm event or preventing recording of the alarm event. In a smash and grab scenario, the gateway 309 may transfer alert signals upstream to the local office 302 so that the authorities can be alerted and/or data regarding the alarm event can be captured before the security system is disabled.

Referring to FIG. 3, when an alarm event is detected, the local office 302 may record the alarm event (e.g., store information identifying the sensor(s) that were tripped, their location, recording video and/or audio showing the event that occurred, etc.), determine an appropriate reaction, and/or transmit a signal to an external network, such as the public switched telephone network (PSTN) 312 or a wide area network (WAN) 313. In one embodiment, the gateway 309 may communicate directly with networks 312, 313, and 316

Via the PSTN 312, the local office 302 may transfer an alert signal to a cell tower 314 and ultimately to a designated cellular device 315 (e.g., smartphone, tablet, etc.). Also, through the PSTN 312, the local office 302 may connect to a public safety answering point (PSAP) 316. Thus, the local office 302 may alert authorities of the alarm, so that the authorities may be dispatched to the premises 300 or vehicle 301.

Additionally, or alternatively, the local office 302 may transfer an alert signal via the WAN 313 (e.g., the Internet) to a monitoring entity 317 and/or a web portal server 318. The monitoring entity 317 may be the same entity as the local office 302 or a third party entity. Regardless, the monitoring entity 317 may be responsible for monitoring the premises 300. This may include responding to alert signals received when the security system detects an alarm event. For example, the monitoring entity 317 may immediately contact appropriate authorities to dispatch them to the premises 300. Or, when an alert signal is transferred to the monitoring entity 317, this may prompt a representative or automated system of the monitoring entity 317 to call the premises or another designated number to confirm the truthfulness of the alarm event.

Meanwhile, the web portal server 318 may be a computing device capable of providing a web portal through which users may view, on any connected display device, information regarding the security of the premises 300 and vehicle 301. Users may log-on to the web portal provided by the web portal server 318 and view an alarm event and/or information related to an alarm event, such as what sensor was triggered and when it was triggered. Also through the web portal, a user may be able to view video of the premises 300 captured by the camera 310 or may be able to check the status of the security system to see if it is armed. Where the web portal server 318 is coupled to a WAN 313, such as the Internet, the web portal for the premises 300 may be accessed using any device that can connect to the WAN 313, such as a smartphone, tablet, laptop, etc. The web portal may also be used to customize settings, such as schedules, to indicate when and how the security system should operate. For instance, using the web portal a user may be able to indicate certain times during which the security system should automatically arm itself if the vehicle 301 is away from the premises 300.

In some embodiments, the web portal may permit a user to view multiple premises 300. That is, a single interface may allow a user to view status information, video, security settings, etc. for a plurality of premises 300. In some cases, such information may be viewed simultaneously on the web portal. Having a single interface may be desirable to users who have multiple security systems at various remote locations, such as users who own multiple homes or businesses.

Figure 4:
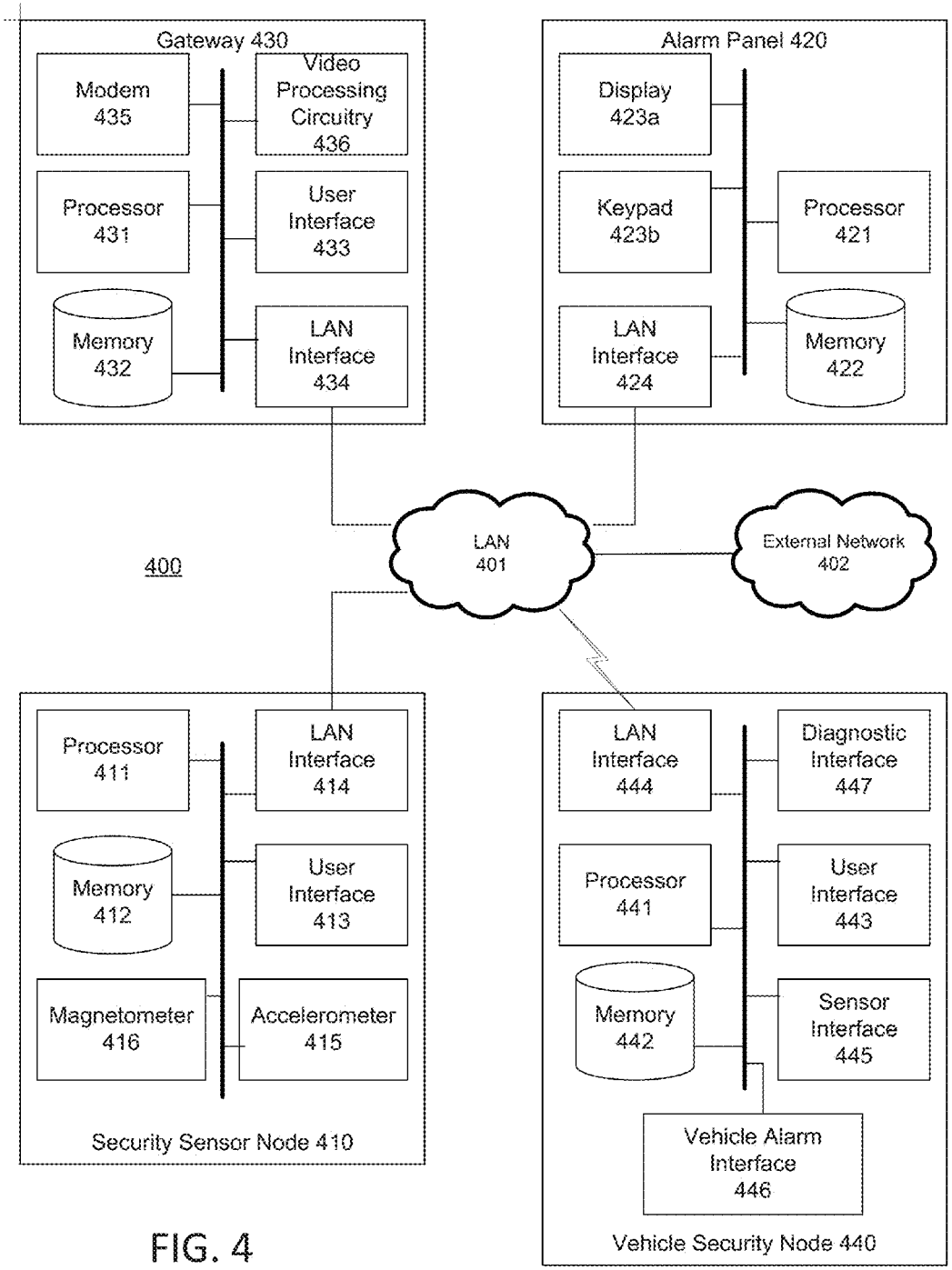
FIG. 4 illustrates an example security system according to one or more aspects described herein.

FIG. 4 illustrates an example security system 400 that may be used in securing a premises 300 and/or one or more properties (e.g., vehicle 301) according to one or more aspects described herein. Security system 400 may include one or more security sensor nodes 410 (which may correspond to or be used with security sensors 306 and 307, cameras 310, and/or vehicle sensors 311 of FIG. 3), an alarm panel 420 (which may correspond to alarm panel 308 of FIG. 3), and a gateway 430 (which may correspond to gateway 309 of FIG. 3) communicatively coupled to one another via a local area network (LAN) 401, which may include various links and repeaters (not shown) and which may be communicatively coupled to an external network 402 (e.g., a WAN). Further, one or more vehicle security nodes 440 may be placed in a vehicle 301 to be integrated with the security system 400. These example components are described in greater detail below.

According to one or more aspects, one or more security sensor nodes 410 may be attached to various objects, or coupled to sensors attached to various objects, that are to be secured, such as windows, doors, furniture (e.g., a chair, a table, an armoire), electronic equipment (e.g., a television, a stereo, a video game console, a computer, a telephone), a fixture (e.g., a safe, a chandelier, a painting, a grill, etc.), etc.

Various security sensor nodes 410 may include various components. For example, a complex security sensor node 410 may include one or more processors 411 configured to execute software instructions stored on a memory 412 (e.g., any computer-readable medium, such as flash memory or a hard drive) to perform various functions described herein.

The security sensor node 410 may include one or more user interfaces 413. The user interfaces 413 may be, for example, any desired type of device to allow interaction with a user, such as buttons, lights, LED displays, audio speakers, etc. Additionally, the security sensor node 410 may include a local area network (LAN) interface 414. The LAN interface 414 may implement any desired type of communication medium for communicating signals between all components in the premises. For example, the LAN interface 414 may be a wireless IEEE 802.11 interface, allowing the security sensor node 410 to wirelessly communicate with the alarm panel 308, gateway 430, one or more vehicle security nodes 440, and/or other devices. Other wireless interfaces could be used as well, such as 802.15.4, ZigBee, Z-Wave, Bluetooth, etc.

The LAN interface 414 can also use a wired medium, such as a MoCA (Multimedia Over Coax Alliance) interface connected to the in-home coaxial cable network, or to an Ethernet network.

The security sensor node 410 may also include one or more accelerometers 415, which may be configured to detect acceleration and/or movement along one or more axes. Additionally, or alternatively, the security sensor node 410 may include one or more magnetometers 416, which may be configured to detect magnetic fields for directional orientation (e.g., north, south) and/or proximity between two items (e.g., an induction coil on a window frame whose magnetic field is disturbed by the proximity of a second component on the window itself). Of course, some of the detection described herein may be performed by the processor 411, based on readings taken from the accelerometer 415 and/or magnetometer 416. Other types of sensing devices may be included within or coupled to the security sensor node 410 as well, such as contact switches, infrared motion detectors, microphone sound detectors, cameras, thermal sensors, etc.

The security sensor node 410 may also include other components (not shown), such as a battery or other power supply, an indicator light, and an antenna, as well as additional accelerometers, magnetometers, transceivers, processors, memory, and input/output interfaces.

The various motion, position, location, movement, etc. detected by the security sensor node 410 may be reported via the LAN interface 414 to the alarm panel 420. The alarm panel 420 may operate within security system 400 to monitor one or more security sensor nodes 410 included in security system 400, and may provide additional functionalities, such as allowing a user to arm security system 400 and/or security sensor nodes 410. For instance, alarm panel 420 may be attached to a wall near an entrance to a secured area, and a user may interact with alarm panel 420 to arm security system 400 and/or security sensor nodes 410. In addition, alarm panel 420 may include a plurality of components, as further described below, that may enable alarm panel 420 to communicate with other devices included in security system 400 and thereby provide arming, monitoring, and other functionalities.

To provide such functionalities, the alarm panel 420 may also include a processor 421, operating to execute software instructions stored in a computer-readable memory 422 (e.g., flash, hard drive, etc.). The alarm panel 420 may include various user interface elements, such as a display 423a and a keypad 423b for inputting data, such as passcodes, and outputting data, such as alert messages. Also, the alarm panel may include a LAN interface 424, similar to the LAN interface 414 of the security sensor node 410, in order to communicate with the security sensor nodes 410, gateway 430, and vehicle security node 440. Moreover, within a single embodiment, the alarm panel 420 may include various types of LAN interfaces 424. For example, the alarm panel 420 may include a wired LAN interface (e.g., a USB interface) for communicating with one or more security sensor nodes 410 and a wireless LAN interface (e.g., Zigbee) for communicating with a vehicle security node 440.

Figure 9:
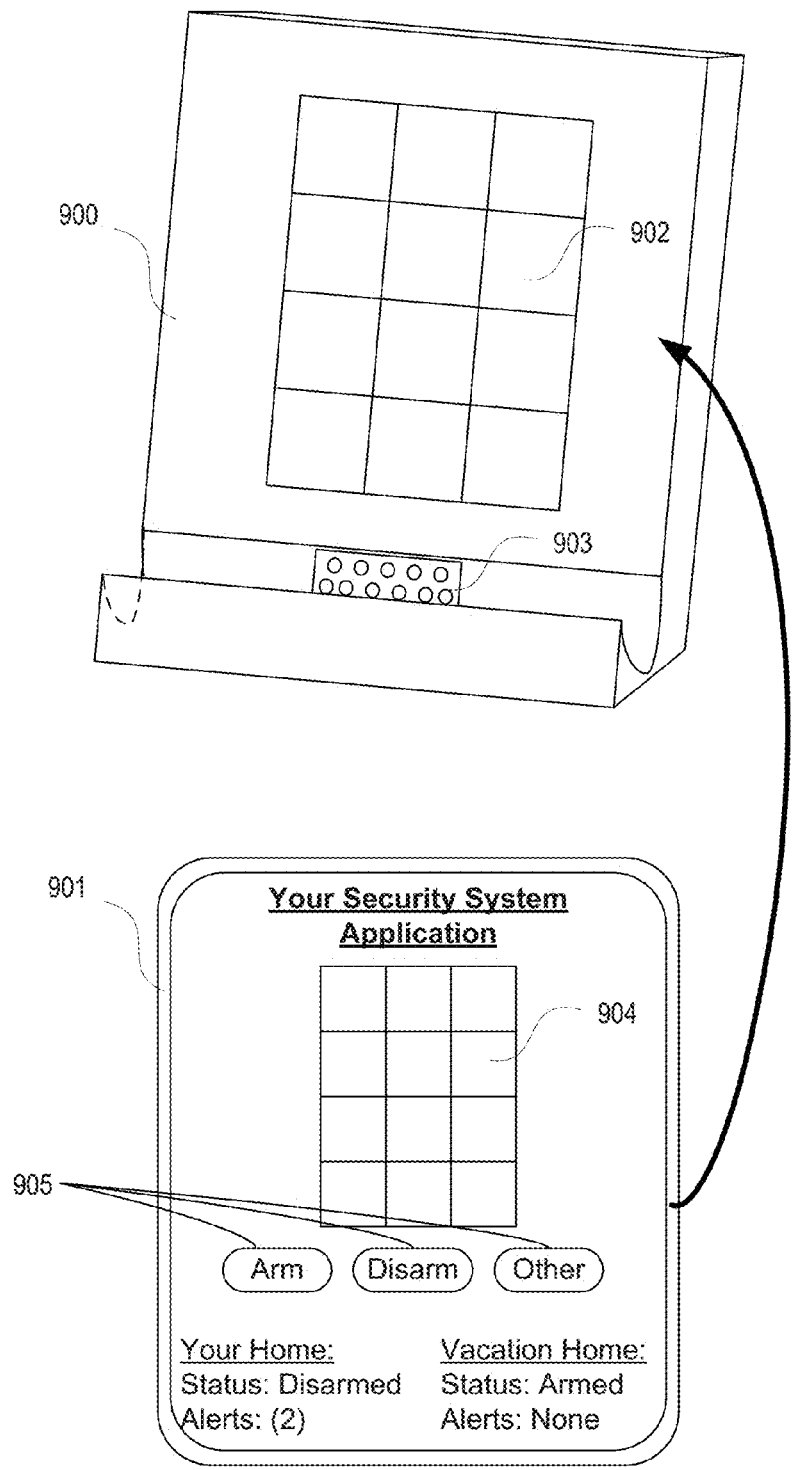
FIG. 9 illustrates an example alarm panel according to one or more aspects described herein.

Furthermore, in some embodiments, the alarm panel 420 may include a dock 900 as shown in FIG. 9. The dock 900 may be configured to receive a portable device 901 (e.g., a tablet, smartphone, etc.). The dock 900 may include a keypad 902 and an adapter 903. The keypad 902 may be hard wired so that communications can be more secure and/or reliable. Using the keypad 902, a user may enter a passcode to arm and/or disarm the security system 400. The keypad 902 may also be used to configure the security sensor nodes 410 and vehicle security nodes 440. Meanwhile, the adapter 903 may be any hardware and/or software connection (proprietary or non-proprietary) that allows the portable device 901 to interface with the dock 900. Examples of possible connections include Ethernet connections, USB connections, portable digital media interface (PDMI) connectors, FireWire connectors, etc. Although not shown, the dock 900 may also include a power supply port and a battery to provide back-up power if needed.

As shown in FIG. 9, the keypad 902 may be positioned on the dock 900 such that it would be obscured by the portable device 901 when the portable device is docked (e.g., connected to the dock via adapter 903). When docked, the portable device may become the sole interface between a user and the security system 400. Therefore, the user may use a keypad 904 of the portable device 901, instead of the keypad 902 of the dock 900. In some embodiments, the keypad 904 of the portable device may be implemented by displaying a keypad on a touch screen of the portable device 901. Further, in one aspect of the present disclosure, the keypad 904 of the portable device 901 is automatically displayed when the portable device is docked to the dock 900. More specifically, a security system application installed on the portable device 901 may be automatically launched (if not already launched) when the portable device 901 is connected to the dock 900 and may process computer-executable instructions (e.g., a script) to display the keypad 904.

The security system application may further provide buttons 905 to arm or disarm the security system or to set the security system into any other mode (e.g., a panic mode, a pre-arm mode, a configuration mode, etc.). In some embodiments, the security application may only allow a user to arm or disarm the security system 400 while the portable device 901 is docked. In other embodiments, the portable device 901 may be able to arm or disarm the security system 400 even when it is not docked.

Additionally, the security system application may allow a user of the portable device 901 to view various information regarding the security system 400. For example, the security system application may give a user access to the status (armed, disarmed, etc.) of the security system 400, information on alarm events detected, video of an alarm event, etc. Further, the security system application may be registered with more than one security system 400 so that a user may view information regarding security systems 400 at different locations via a single interface.

The dock 900 may also be configured to receive different portable devices 901. Therefore, when one user removes his/her portable device 901 from the dock 900, another user may dock his/her portable device 901 at the dock 900. The dock 900 may be able to interface with any portable device 901 having an authorized security system application. In some embodiments, the portable device 901 may be authorized so that a passcode for the security system does not need to be entered each time the portable device 901 is docked. In other embodiments, the security system application may prompt the user for a passcode each time it is docked. Also, in some embodiments, the dock 900 may be configured to transmit information to and from the portable device 901 only when it is docked, whereas in other embodiments, the dock 900 may transmit information to and from the portable device 901 whether or not it is docked.

Another feature of the dock 900 may be the ability to charge the portable device 901 while it is docked. This may incentivize users to use their portable devices 901 as interfaces to the security system 400. Such a feature also may allow the portable device 901 to remain docked for an extended period of time.

In light of the above, it should be understood that the dock 900 and portable device 901 may have many features that enable them to function as the alarm panel 420.

Turning back to FIG. 4, in one or more arrangements, the alarm panel 420 may also be implemented as hardware and/or software components in another device, such as gateway 430, which is further described below. Or, some or all of the alarm panel functionality can be duplicated in the gateway device 430, and the gateway may include similar components as those found in the alarm panel 420. For example, gateway 430 may include a processor 431, configured to execute instructions stored on a computer-readable memory 432. It may also include one or more user interfaces 433 (e.g., buttons, keypads, infrared remote control, etc.), and a LAN interface 434 to allow communications with the security sensor nodes 410, alarm panel 420, vehicle security node 440, and/or with other devices on the premises 300.

The gateway 430 may also include other communication devices as well. For example, it may include a device for communicating with an external network, such as a modem 435. Thus, the gateway 430 may be connected to, and communicate with, the local office 103 or an external network 109. It may also include video processing circuitry 436, which can decode and/or decrypt incoming video signals, and generate an output video signal that can be supplied to a display device (e.g., a television 303). Accordingly, the gateway 430 may generate one or more user interface screens, for display on the television 303 or a personal computer, that allow a user to arm and disarm security system 400, configure attributes of a security sensor node 410 or vehicle security node 440, manage profiles, transmit test alerts, and monitor one or more security sensor nodes 410 and vehicle security nodes 440 included within the security system 400. In some embodiments, the gateway 430 may also include functionality of a traditional television set-top box (STB) and/or a digital video recorder (DVR).

The security system 400, including one or more security sensor nodes 410, alarm panel 420, and gateway 430, may be extended to include one or more vehicle security nodes 440. The vehicle security node 440 may include a processor 441 and memory 442 for storing computer-executable instructions that when executed by the processor allow the vehicle security node to perform the functions described herein. Moreover, the vehicle security node 440 may include one or more user interfaces, having buttons, lights, a microphone, a display, a keypad, etc., through which a user can configure, evaluate, and/or control the vehicle security node 440. Furthermore, the vehicle security node 440 may include a LAN interface 444. The LAN interface 444 may implement any desired type of communication medium for communicating signals between the vehicle security node and the other components in the premises. For example, the LAN interface 444 may be a wireless IEEE 802.11 interface, allowing the vehicle security node 440 to wirelessly communicate with the security sensor nodes 410, alarm panel 420, and/or gateway 430. Other wireless interfaces may be used too, such as 802.15.4, ZigBee, Z-Wave, Bluetooth, Satellite, Cellular, etc. The LAN interface 444 can also use a wired medium, such as a MoCA (Multimedia Over Coax Alliance) interface connected to the in-home coaxial cable network, or to an Ethernet network. For example, when the vehicle is parked in a garage, the vehicle security node 440 may easily be wired to the other devices of the security system 400.

Additionally, the vehicle security node 440 may have a sensor interface 445 for communicating with one or more vehicle sensors 311 located on the same vehicle 301. The vehicle sensors 311 may include accelerometers 415, magnetometers 416, etc. and may be used to measure or detect temperature, pressure, impact, motion, glass breakage, etc. The vehicle sensors 311 may communicate with the vehicle security node 440 over wired or wireless connections. Also, the communications between the vehicle sensors 311 and the vehicle security node 440 may use any protocol, such as Ethernet, USB, IEEE 802.11, etc. In one or more arrangements, the vehicle security node 440 may include one or more vehicle sensors 311 so that the vehicle security node may itself detect an alarm event. In other words, the vehicle security node 440 and vehicle sensors may be one in the same. In such arrangements, the sensor interface 445 may serve to input data (e.g., an alert signal) indicating an alarm event.

Further, the vehicle security node 440 may include a vehicle alarm interface 446. The vehicle alarm interface 446 may be any desired wired or wireless connection, and may connect the vehicle security node 440 to the vehicle's pre-existing alarm system. Pre-existing vehicle alarm systems may include contact sensors, shock sensors, glass breakage sensors, magnetic contact sensors, motion sensors, perimeter (radar) sensors, etc. in order to detect impact, vibrations, heat, glass breakage, etc. By connecting to the pre-existing alarm system, the vehicle security node 440 may detect whenever the pre-existing alarm system is triggered. As a result, the vehicle security node 440 may notify the gateway 430, alarm panel 420, and/or other security sensor nodes 410 when the pre-existing alarm system is triggered.

Moreover, the vehicle security node 440 may include a diagnostic interface 447, which is configured to connect to a vehicle's On-Board Diagnostic (OBD) system via the OBD-II connector. The OBD-II connector is a well-known connector in the automotive industry and is used to output diagnostic data from a vehicle 301. The diagnostic interface 447 may scan the vehicle's data bus and retrieve the OBD-II codes, which may indicate various information about the vehicle, such as fuel system status, engine coolant temperature, fuel pressure, engine oil temperature, etc. The diagnostic interface 447 may directly connect to the OBD-II connector or may wirelessly connect to the OBD-II connector. Further, the diagnostic interface 447 may be configured to relay the information obtained from the vehicle's bus to the LAN interface 444 so that the information may be transferred to the gateway 430, alarm panel 420, security sensor nodes 410, or other devices upstream. Accordingly, information regarding the status of the vehicle 301 may be ascertained from the display 423*a* on the alarm panel 420 and/or from a device connected to the video processing circuitry 436 of the gateway 430.

It should be understood that the configurations of the different components are shown by way of example and are not intended to be limiting. For example, the vehicle security node 440 may not have a sensor interface 445 to communicate with additional sensors, and instead, may rely solely on the sensors of the pre-existing alarm system.

Figure 5:
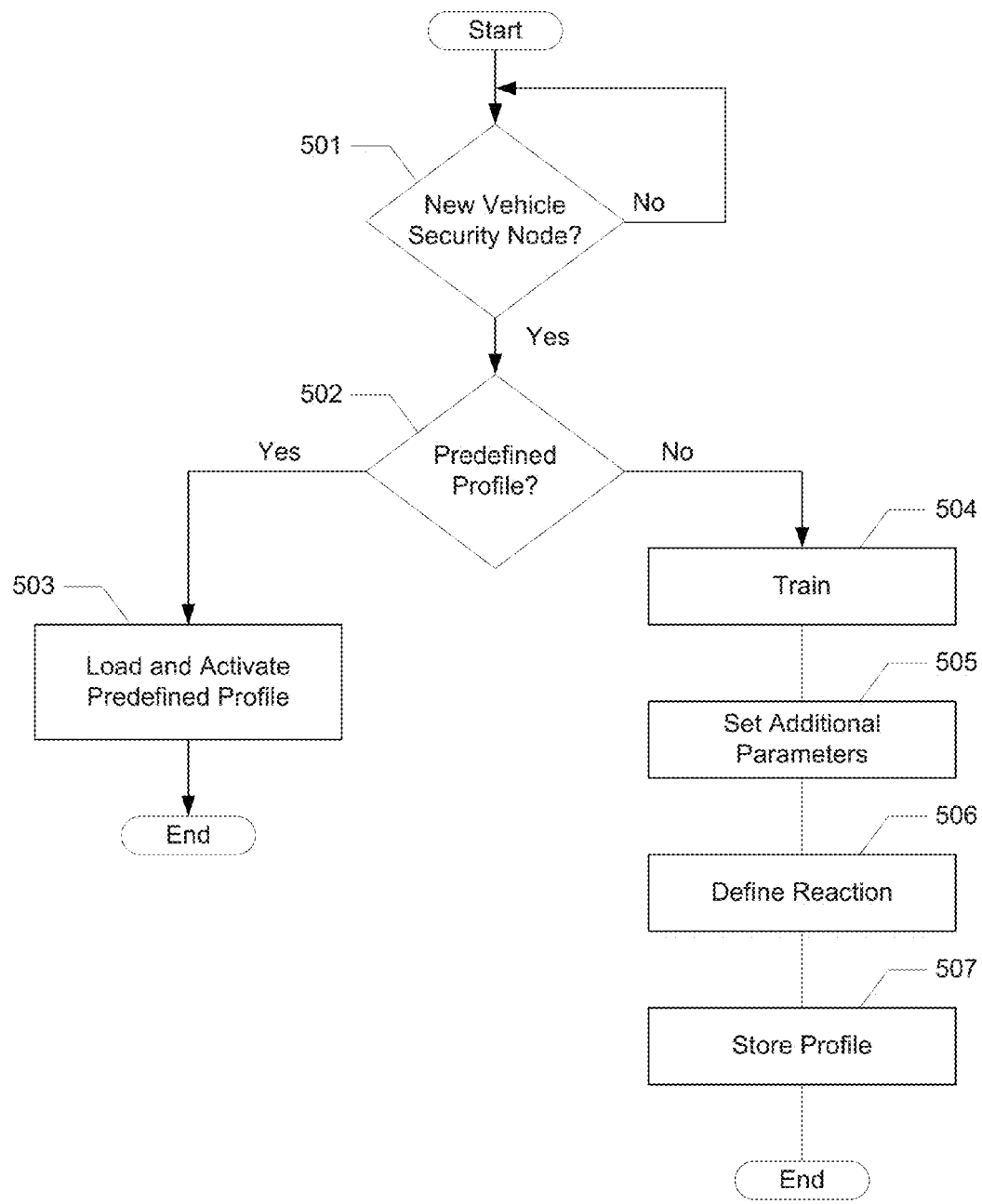
FIG. 5 illustrates an example process of registering a security node according to one or more aspects described herein.

FIG. 5 illustrates an example process of registering a vehicle security node 440 with the security system 400. Once the new vehicle security node 440 is installed on the vehicle 301 and powered on, the security system 400 may detect its presence in step 501. Such detection of the presence of the new vehicle security node 440 may occur automatically. For instance, the alarm panel 420 and/or gateway 430 may use a wireless local area network to search for the newly-introduced vehicle security node 440. Alternatively, the newly-introduced vehicle security node 440 may be placed in a "pairing" mode when it is installed. While in the pairing mode, the vehicle security node 440 may transmit a distributed signal (e.g., a broadcast radio signal) indicating that the vehicle security node 440 is new and/or online. The gateway 430 and/or alarm panel 420 may detect this broadcast signal, thereby learning of the new vehicle security node 440. Alternatively, the gateway and/or alarm panel may simply be told by the user that a new vehicle sensor node 440 has been installed (e.g., by a menu option, or pressing a predefined "add vehicle security node" button, entering a code identifying the vehicle security node 440, etc.).

Step 501 may be performed until the vehicle security node 440 is detected. When the vehicle security node 440 is detected, the process of registering the vehicle security node 440 may proceed to step 502. In step 502, it is determined whether or not the vehicle security node 440 has a predefined security profile. Herein, the security profile defines what a vehicle security node 440 will sense and how the security system 400 will interact with the vehicle security node 440 including how it will react to information received from the vehicle security node 440. In some embodiments, a vehicle security node 440 may include a predefined profile. A manufacturer or other pre-installation distributor may offer a data file (stored in the vehicle security node 440 or available for downloading) containing a set of instructions for communicating with the security system 400. The instructions may control the vehicle security node 440 to, for example, transfer certain diagnostic information obtained through the OBD-II connectors or transfer notifications that the pre-existing vehicle alarm system has been triggered to the security system 400. The instructions may also control how the gateway 430 or alarm panel 420 respond to information received from the vehicle security node 440. For example, the predefined profile may include instructions that cause the gateway 430 or alarm panel 420 to arm the security system 400 when the vehicle security node 440 no longer transmits a signal thereby indicating that the vehicle has left the proximity of the security system 400. The predefined profiles may be a software download made available to purchasers of the vehicle security node 440, or the software could be distributed on computer-readable media (e.g., a CD, built-in or external flash drive, etc.) with the vehicle security node 440.

Alternatively, the gateway 430 and/or alarm panel 420 may automatically store a database containing many different predefined security profiles (e.g., the gateway's security system software may include default profiles for vehicle security nodes 440 that are customized for people who live alone, people who have kids, etc.). Alternatively, the gateway 430 may download the predefined profiles from the local office 302 or other entity coupled to the WAN 313. In any case, the gateway 430 may display a list of available profiles that fit the behavior of the user. For example, if the user lives alone, the security system 400 may be armed whenever the vehicle security node 440 loses communication with the security system 400, whereas if the user has family members or roommates that have vehicle's 301 with vehicle security nodes 440 as well, the security system 400 may not arm itself unless all vehicles 301 are away from the premises 300.

The determination of whether a predefined profile exists may be made in a variety of ways. For example, if the new vehicle security node 440 automatically broadcasts its presence, it can also indicate in the broadcast that it has a predefined profile in its own memory 442, or that one is available for download. Alternatively, it could simply identify itself with an identifier (e.g., identifying a class of device, manufacturer, model number, serial number, etc.), and the gateway 430 could search its own memory 432 to determine if it already has a predefined profile for the new vehicle security node 440. The gateway 430 could also transmit a request out onto the Internet or another network (or a server associated with the maker of the vehicle security node 440 or the vehicle 301 being secured) asking if a predefined profile exists, and, if it does, requesting to download it.

If a predefined profile exists, then the process may proceed to step 503, and the predefined profile may be loaded for use by the gateway 430 and/or alarm panel 420. This loading may be done in any desired manner (e.g., copying from a memory 442 of the vehicle security node 440, copying from a memory provided along with the vehicle security node 440, copying from a pre-existing database in the gateway 430, downloading from an external server to the gateway 430, etc.). Once the profile is loaded, the process of registering may end, and the security system 400 may begin communicating with the vehicle security node 440.

If, in step 502, no predefined profile exists, then the process may proceed to step 504, and the user can begin a training process to train the security system 400 in using the new vehicle security node 440. This can be initiated, for example, by the gateway 430 or alarm panel 420 displaying (e.g., on the alarm panel display 423*a*, the television 303, or a computer) a message requesting that the user start the training for the new vehicle security node 440.

In step 504, the user may train the security system 400 to recognize an approximate position of the vehicle 301 on which the vehicle security node 440 is installed. Once the vehicle security node 440 is installed on the vehicle 301, it may transmit (e.g., broadcast) a signal via its LAN interface 444. The security system 400 may be trained to receive the transmitted signal and determine its signal strength. By positioning the vehicle 301 in a desired location (e.g., in a garage, in a driveway, or on the street in front of a premises 300 having the security system 400) and recording the signal strength of the transmitted signal while the vehicle 301 is in that position, the security system 400 may be taught the desired position of the vehicle 301. The user may inform the gateway 430 or alarm panel 420 when the vehicle is in the desired position, for example, by pressing a button on the alarm panel 420. After recording the signal strength when the vehicle 301 is in the desired position, the security system 400 may determine when the vehicle 301 is moved from the desired position by detecting a change in the signal strength. For example, the security system may determine that the vehicle has left the proximity of the security system 400 when it no longer detects the transmitted signal from the vehicle security node 440. In some embodiments, the security system 400 may be taught a permissible range in which the vehicle 301 may be positioned with respect to the security system 400. For example, it may be acceptable for the vehicle to be parked in any spot on the street in front of a house having the security system 400, but not acceptable if the vehicle 301 is parked on the opposite side of the street. Or, it may be acceptable if the vehicle 301 is in the garage, but not in the driveway.

Additionally, multiple points and corresponding tasks may be designated. For example, the user may wish to turn on lights along the driveway when the vehicle 301 is at one distance, open a garage door when it's at a closer distance, and disarm the security system 400 and/or turn on inside lights when the vehicle is at an even closer distance. Each of these points may be associated with a recorded signal strength of the signal received from the vehicle security node 440. While the above description explains how step 504 can train the security system 400 to identify positions of the vehicle 301, step 504 may also be performed to simply train the security system 400 to recognize the vehicle security node

440. That is, training at step 504 does not require setting certain signal strengths. In some embodiments, training may comprise training the security system 400 to associate a particular transmitted signal (e.g., having a particular frequency, transmitting particular data, etc.) with the vehicle security node 440 so that integration of the security system 400 with the vehicle security node 440 may be authorized.

When the user has finished defining the acceptable range(s) of signal strength, the process may proceed to step 505. At step 505, the user can define any additional desired parameters. For example, if the user wants different behavior for different days of the week and times of day, then the user can define time ranges as additional parameters. Any other desired parameter can be combined as well (e.g., state of television viewing, number of cars in the garage, season of the year, outside temperature, etc.).

After setting any desired additional parameters, the process may move to step 506. At step 506, the user can define the security system's alarm reactions for the various parameters. In one or more arrangements, the security system 400 may be programmed to arm itself when it is determined that the vehicle 301 is not within the registered position. That is, the security system 400 may instructed to enter an armed state when the signal strength of the signal received from the vehicle security node 440 drops below a certain threshold. Further, the security system 400 may be programmed to perform other intervening steps. For example, the security system 400 may be programmed to send a signal (e.g., a text message, email, satellite signal) to a designated user device (e.g., a device of the driver of the vehicle that left, such as a tablet, smartphone, GPS, etc.) to request whether the security system 400 should be armed. Another example intervening step may be to determine based on a predefined schedule (e.g., a user defined schedule) whether the security system 400 should be armed. Still another example intervening step may be to monitor motion sensors, cameras, heat sensors, etc. to detect whether anyone is remaining in the premises 300 so that the premises 300 may only be armed if the security system 400 determines that no one else remains at the premises 300. It should be understood that a combination of these intervening steps may also be performed.

Other reactions defined at step 506 may be to turn on lights, open a garage door, and/or disarm the security system 400 when the vehicle enters the registered position or zone. Yet another reaction may be to trigger the vehicle's pre-existing alarm system (and thereby alert any persons in the vicinity of the vehicle) when the security system 400 detects an alarm event associated with the premises 300, or to alert the security system 400 to send an alert signal when the vehicle's alarm system is triggered. For example, if a home security system alarm is triggered because of a smoke alarm tripping, or because a burglar opens a window, the home security system can instruct a nearby automobile alarm to also begin sounding its general or specific alarm, helping to alert others to the problem. Conversely, if an automobile alarm is triggered due to a thief breaking a car window, the automobile alarm system can send a signal to the homeowner's home alarm system, and the home alarm system can sound its own alarm, helping to alert others to the problem. In light of the above, it should be evident that a number of reactions may be defined at step 506.

After the alarm reactions have been defined, the process may then store the registered location (e.g., signal strengths associated with the registered location) or other information from the signal transmitted by the vehicle security node 440, additional parameters, and reactions in a profile on the memory 442 of vehicle security node 440, the memory 432 of the gateway 430, the memory 422 of the alarm panel 420, and/or memory of the local office 302 at step 507. The profile can become a predetermined profile for other vehicle security nodes 440 added in the future, and can be labeled according to the vehicle 301 it serves.

Figure 6:
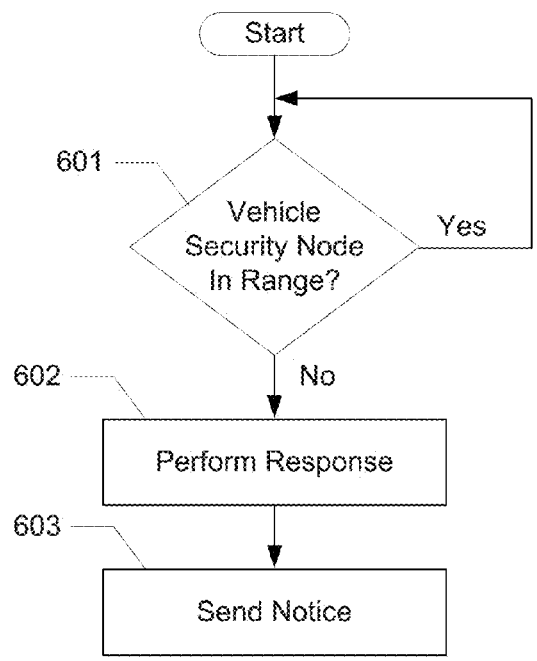
FIG. 6 illustrates an example process according to one or more aspects described herein.

FIG. 6 illustrates an example process in accordance with an aspect of the present disclosure. More specifically, FIG. 6 shows steps in a process of reacting to movement of a vehicle 301 away from, or out of the proximity of, its corresponding security system 400. FIG. 6 begins with step 601 in which the security system 400 monitors the status of the vehicle security node 440. In step 601, the security system 400 may periodically detect a signal strength of a signal emitted from the vehicle security node 440. If the security system 400 determines that the signal strength is greater than a predetermined signal strength threshold, then the security system 400 determines that the vehicle security node 440 is in range of the security system 400 at step 601. However, if the security system 400 determines that the signal strength is less than or equal to the predefined signal strength threshold, then the security system 400 determines that the vehicle security node 440 is out of range. Herein, the predetermined signal strength threshold may be obtained from a predefined profile or set by a user or operator of the security system 400, an installer of the vehicle security node 440, or any other authorized person. In some embodiments, the predetermined signal strength threshold may be the minimum signal strength that is needed to communicate between the vehicle security node 440 and security system 400.

If the vehicle security node 440 is in range (Yes at step 601), the security system 400 may wait a predetermined period of time before performing step 601 again. But, if the security system 400 is out of range (No at step 601), the process proceeds to step 602. In some embodiments, the security system 400 may have to determine that the vehicle security node 440 is out of range for a certain period of time or determine that a certain number of out of range determinations have been made before proceeding to step 602.

In step 602, the security system 400 may be armed. The security system 400 may be armed immediately or soon after the security system 400 detects that the vehicle security node 440 is out of range. Alternatively, the security system 400 may enter a pre-arm mode in which the security system 400 detects whether certain events, such as the triggering of a motion sensor, occur in a set period of time before arming the security system 400. For example, when the vehicle security node 440 becomes out of range, the security system 400 may wait to see if motion sensors or cameras 310 in the premises 300 are triggered thereby indicating that someone is still in the premises 300, before arming the security system 400. In this manner, the security system 400 may prevent arming itself when not all people have left the premises 300. Whether the security system 400 is armed immediately or a pre-arm mode is entered may be defined by a profile. The profile may take into consideration programmed or learned habits or characteristics of those entering and exiting the premises 300. For example, the profile may learn to arm the security system 400 immediately if the vehicle security node 440 moves out of range at approximately 8:00 am on a weekday when a person leaves for work. Or, for example, the profile may be programmed to cause the security system 400 to enter a pre-arm mode when the vehicle security node 440 moves out of range because the programmer knows that multiple people reside at the premises.

Additionally, or alternatively, step 602 may include performing a security system check to determine the status of the security system 400. For instance, the security system 400 may monitor one or more of its sensors to detect whether a door 304 or window 305 is open or certain lights are on. As part of the security system check, the security system 400 may compare its findings against a profile to determine if certain findings are acceptable. For example, a profile may indicate that a particular window 305 may remain open or particular lights may remain on, and therefore, the security system check might not report these findings.

Step 603 may be performed to notify a certain person of the results of step 602. That is, the security system 400 may send a notice to one or more designated user devices indicating whether the security system 400 was armed or not, whether the security system 400 entered into a pre-arm mode, or what was discovered as a result of the security system check. The notice may be in the form of a text message, an email, a satellite message, an alert message displayed on a web portal, etc. and may be sent in response to actions taken in step 602. In one aspect of the disclosure, a notice (e.g., a text message) may be sent to the portable device 901 or a smartphone or tablet of a particular user associated with the vehicle including the vehicle security node 440 to indicate that the security system 400 has been armed or has entered into a pre-arm mode. The notice may also indicate that lights were left on or that a door 304 or window 305 was left open so that the user may return to the premises 300 to remedy the situation if he/she so desires. The message may be sent relatively soon after the vehicle 301 leaves the premises 300, so that the return trip to the premises 300 is reduced.

In another aspect of the disclosure, the notice may be displayed on a screen (e.g., a GPS display) or played through a speaker within the vehicle 301 that left the premises 300. This notice may be received through a wireless connection (e.g., cellular connection, satellite connection, etc.). Alternatively, this notice may be generated from information obtained by the vehicle security node 440 prior to moving out of range and losing communication with the security system 400. While the vehicle security node 440 is in range, it may communicate back and forth with the security system 400 to ascertain information regarding the security system 400, such as whether the security system 400 is armed or not, what doors/windows are open, what lights are on, etc. This information may be ascertained periodically or continuously. Therefore, the vehicle security node 440 may know the state of the security system 400 at the time it loses communication with the security system 400. Based on this ascertained information, the vehicle security node 440 may generate a notice, and deliver the notice to those in the vehicle 301 having the vehicle security node 440. In some embodiments, the vehicle security node 440 and/or security system 400 may detect that the vehicle security node 440 is nearly out of range based on a weakening signal strength, and in response, send the latest information regarding the security system 400 at this time.

Further, in some embodiments, step 603 may be performed prior to step 602. A notice may be sent to prompt the particular user to select how the security system 400 should perform. For example, the notice may prompt the user to select whether or not to arm the security system 400, whether or not to enter into a pre-arm mode, and/or whether to turn on/off lights, lock doors, turn on/off a television, adjust a thermostat, etc.

Figure 7:
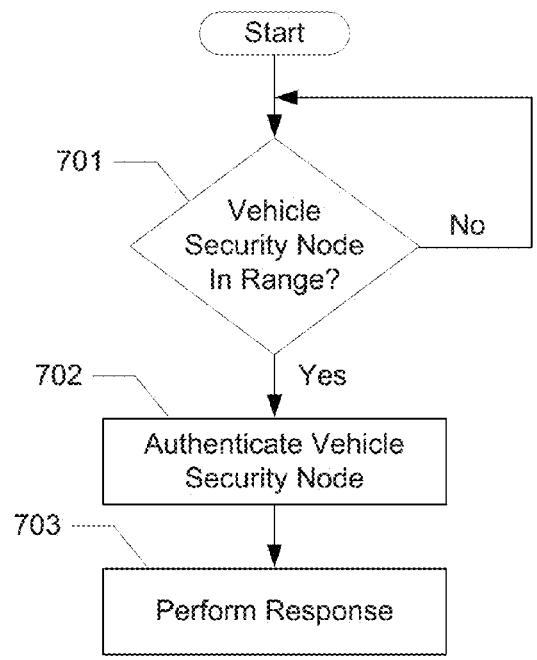
FIG. 7 illustrates another example process according to one or more aspects described herein.

FIG. 7 illustrates an example process in accordance with another aspect of the present disclosure. More specifically, FIG. 7 shows steps in a process of reacting to the reentry of a registered vehicle security node 440 into the proximity of the security system 400. FIG. 7 begins with step 701, which performs similar functions to those described above with regards to step 601. That is, step 701 may compare signal strength with a predetermined signal strength threshold to determine whether the vehicle security node 440 is in range of the security system 400. However, if the security system 400 determines that the vehicle security node 440 is not in range at step 701 (No at step 701), the security system 400 may wait a predetermined period of time before performing step 701 again. Step 701 may be repeated until the security system 400 determines that the vehicle security node 440 is back in range. Once the vehicle security node 440 is determined to be in range (Yes at step 701), the process proceeds to step 702.

In step 702, the security system 400 may authenticate the vehicle security node 440. That is, the vehicle security node 440 may provide a key to the security system 400 to prove that it has previously registered with the security system 400. Where a plurality of vehicle security nodes 440 are used in the same security system 400, each vehicle security node 440 may have its own key so that the security system 400 can identify the exact vehicle security node 440 that it is communicating with and can respond differently to actions of different vehicle security nodes 440. After the vehicle security node 440 is authenticated at step 702, the process may proceed to step 703.

In step 703, the security system 400 may respond to the reentry of the previously registered vehicle security node 440. A profile may exist for the particular vehicle security node 440 which may define what actions to take in step 703. Or, the security system 400 may perform a general response for all authenticated vehicle security nodes 440. One response that may be performed at step 703 may include the security system 400 turning on lights in or outside of the premises 300. In some embodiments, the response may depend on a schedule so that, for example, outside lights are turned on if the vehicle security node 440 returns at night. Another response that may be performed may be to open a garage door or gate. Or, if the particular security system 400 is not capable of controlling the operation of the garage door or gate, it may at least disarm a portion of the security system 400 so that the alarm is not triggered when the garage door or gate is opened.

Still another response may be to disarm the security system 400 entirely. In some instances, disarming a security system 400 may be desired only if the vehicle security node 440 is in a particular location. Therefore, the security system 400 may be trained to determine a vehicle security node's location from signal strength as explained above with reference to FIG. 5. Once trained, the security system 400 may be programmed to disarm the security system only if the vehicle is in a certain location, such as in a garage. Where disarming the entire security system 400 is a sensitive issue, tighter scheduling restrictions may be implemented. In other words, a profile may require that it be a certain period of the day in order to disarm the security system 400 in response to detecting the reentry of the vehicle security node 440. As a result of entirely disarming the security system 400, a person may not have to enter a security code on a keypad of the alarm panel 420 when he/she enters the premises 300.

Additionally, or alternatively, the response of step 703 may be to implement the vehicle alarm system (i.e., the pre-existing vehicle alarm system and/or vehicles sensors 311) into the security system 400. This may entail a bi-directional exchange of information between the vehicle security node 440 and the security system 400. As a result, an alarm event detected by the vehicle's alarm system may be transmitted from the vehicle security node 440 to the security system 400 to trigger the security system 400 to react (e.g., make noise, turn on lights, record video, call authorities, etc.). Vice versa, an alarm event detected by the security system 400 may be transmitted to the vehicle's alarm system to trigger a reaction (e.g., horn sounds, flashing lights, etc.). Thus, the vehicle alarm system may become an extension of the security system 400 and the security system 400 may become an extension of the vehicle alarm system.

Figure 8:
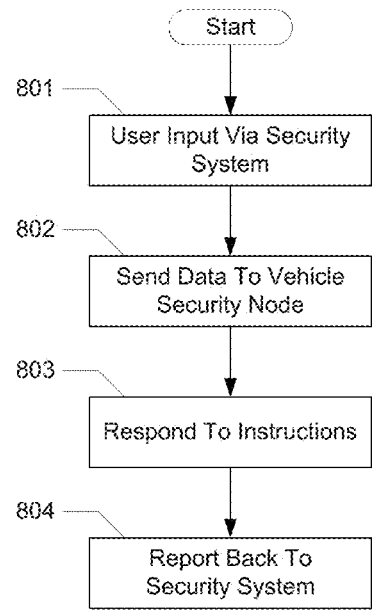
FIG. 8 illustrates yet another example process according to one or more aspects described herein.

FIG. 8 illustrates an example process in accordance with yet another aspect of the present disclosure. More specifically, FIG. 8 shows steps in a process of communicating with a vehicle security node 440 through an interface of the security system 400. The process of FIG. 8 begins with step 801 in which a user input is received by the security system 400. The user input may be received through any interface of the security system 400, such as the alarm panel 420 (or the portable device 901), the television 303, a device (e.g., smartphone) having a security system application stored thereon, a computer within the premises 300, and the web portal. Further, the user input may be a request for information from the vehicle security node 440 or a command. The request for information may include a request for vehicle diagnostic information (e.g., engine status, fuel status, battery status, tire pressure, oil temperature, and other information ascertained through the OBD-II connector). Additionally, or alternatively, the requested information may include vehicle alarm information (e.g., whether the doors are locked, windows are closed, whether the vehicle alarm is on, etc.). Meanwhile, examples of commands that may be sent include commands to turn on a vehicle alarm, lock doors, close windows, begin/end charging a battery, turn on heat or air conditioning, start an engine, etc. Where multiple vehicle security nodes 440 are registered with the same security system 400, the user input may specify the particular vehicle 301 that the command or request is directed to.

At step 802, data in accordance with the received user input is transmitted to the vehicle security node 440. The security system 400 may first interpret the user input and generate data to instruct the vehicle security node 440 to perform a command or provide information before transmitting the data. The transmission may occur via a wired connection or a wireless connection. Any protocol may be used to transmit the data to the vehicle security node 440. In some embodiments, step 802 may include detecting a signal strength of the vehicle security node 440 to determine whether the data may be transmitted. If the detected signal strength is below a predetermined threshold, then the security system 400 may alert the user that the data could not be sent.

Once the data is received at the vehicle security node 440, step 803 is performed. In step 803, the vehicle security node 440 interprets the data received from the security system 400. If the data is related to a command, then the vehicle security node 440 instructs the appropriate devices to perform the command. For example, if the data pertains to a command to lock the doors, the vehicle security node 440 may command the door locks to move to the lock position. Meanwhile, if the data is related to a request, then the vehicle security node 440 retrieves information to fulfill the request. For example, if the data pertains to a request for diagnostic information, the vehicle security node 440 may scan the vehicle's bus using, for example, the OBD-II connector, and ascertain the appropriate codes.

Next, in step 804, the vehicle security node 440 may generate a report to transmit back to the security system 400. The report may include the information the user requested or may include a confirmation indicating whether or not the command the user inputted was performed. Where the information requested is diagnostic information, the vehicle security node 440 may translate the codes into more descriptive messages, and send back the descriptive messages. In other embodiments, the vehicle security node 440 may instead transmit the codes, and the codes may be translated by the security system 400. To perform the translation, the security system 400 may request the translation through the gateway 430. Thus, changes in code meanings may be made upstream thereby avoiding possible inconvenience to a user.

Although FIG. 8 shows that steps 803 and 804 are performed in response to a user input at step 801, this is not necessary. In some embodiments, step 803 and/or step 804 may be performed in response to scheduled settings or people actions. That is, the security system 400 may automatically instruct the vehicle security node to perform certain commands or provide certain information according to a schedule or people actions. For example, when all lights are turned off at night, the security system 400 may send a command to the vehicle security node 440 to lock its doors and/or arm its vehicle alarm system. Or, for example, when a user arms the security system 400 at night, the vehicle security node 440 may automatically report information about the vehicle 301, such as whether the vehicle 301 doors are locked, whether the vehicle 301 windows are open, whether the vehicle 301 battery is dead, etc. In another example, the vehicle security node 440 may automatically arm the vehicle 301 if it is in range at 10:00 pm according to a set schedule.

The features described above are examples of various concepts, and they may be modified in any desired manner. For example, various elements and steps may be divided, combined, rearranged, omitted, and augmented as desired. The various elements may be implemented using computer components, such as processors and computer-readable memories, and any of the elements described herein may be implemented using software, hardware (e.g., similar to that shown in FIG. 2), or any combination of the two. The scope of this patent should only be limited by the claims that follow.

What is claimed is:

1. A method, comprising:
receiving, by a security system of a premises, a signal from a mobile security node via a wireless link;
determining that a strength of the signal is greater than a first threshold indicated by a profile associated with the mobile security node, wherein the first threshold is greater than zero;
and
integrating the mobile security node with the security system in response to determining that the strength of the signal is greater than the first threshold.

2. The method of claim 1, further comprising:
transmitting data from the security system to the mobile security node.

3. The method of claim 2, wherein the transmitting data comprises transmitting a request for information regarding the mobile security node, a command instructing the mobile security node to perform a function, or both, the method further comprising:
receiving, by the security system, a report from the mobile security node in response to the transmitting of the data.

4. The method of claim 3,
wherein, if the data comprises the request for information, the receiving the report comprises receiving the information; and
wherein, if the data comprises the command, the receiving the report comprises receiving a confirmation that the function has been performed.

5. The method of claim 4, wherein
the mobile security node comprises a mobile security node in a vehicle; and
the transmitting the request for the information comprises transmitting a request for vehicle diagnostic information, a request for vehicle alarm information, or both.

6. The method of claim 1, wherein the mobile security node comprises a mobile security node in a vehicle.

7. The method of claim 1, further comprising:
performing a training process to establish the first threshold.

8. The method of claim 7, wherein the performing the training process to establish the first threshold comprises storing, as the first threshold, a strength of a test signal from the mobile security node while the mobile security node is located at a first location.

9. The method of claim 1, further comprising:
responsive to determining that the mobile security node is out of range based on a signal strength of a second signal received from the mobile security node, monitoring the premises for a predetermined period of time before determining whether to arm the security system.

10. The method of claim 1, further comprising triggering an alarm associated with the mobile security node if at least one sensor of the security system is triggered.

11. A method comprising:
receiving a signal from a mobile security node via a wireless link;
determining that the mobile security node is out of range by determining that a signal strength of the signal received from the mobile security node is less than a threshold, wherein the threshold is greater than zero; and
in response to determining that the mobile security node is out of range, performing at least one of arming a security system of a premises, prompting a user to determine whether to arm the security system, or instructing the security system to monitor the premises for a predetermined period of time.

12. The method of claim 11, further comprising:
receiving a user input;
transmitting, by the security system, data to the mobile security node in response to the receiving of the user input; and
receiving a report from the mobile security node in response to the transmitting of the data.

13. The method of claim 11, further comprising:
in response to determining that the mobile security node is in range based on a signal strength of a second signal received from the mobile security node, performing at least one of disarming the security system, or prompting a user to determine whether to disarm the security system.

14. The method of claim 13, further comprising:
defining the range by training the security system to determine that the mobile security node is in range when the signal strength of the second signal is greater than a certain signal strength.

15. A method comprising:
receiving a signal from a vehicle security node via a wireless link;
determining that the vehicle security node is within range by determining that a signal strength of the signal is greater than a first threshold indicated by a profile associated with the vehicle security node, wherein the first threshold is greater than zero; and
in response to determining that the vehicle security node is within range, performing at least one first action that comprises causing disarming of a security system that monitors a premises, causing opening a door on the premises, causing unlocking a door on the premises, or causing turning on a light on the premises.

16. The method of claim 15, further comprising:
determining that the signal strength is greater than a second threshold, wherein the second threshold is greater than the first threshold; and
in response to determining that the signal strength is greater than the second threshold, performing at least one second action that comprises causing disarming the security system, causing opening a door on the premises, causing unlocking a door on the premises, and causing turning on a light on the premises, wherein the at least one second action is different from the at least one first action.

17. The method of claim 15, further comprising:
responsive to determining that the vehicle security node is out of range based on a signal strength of a second signal received from the vehicle security node, monitoring the premises for a predetermined period of time before determining whether to arm the security system.

18. The method of claim 15, further comprising:
in response to determining that the vehicle security node is within range, transmitting a request for vehicle diagnostic information or a request for vehicle alarm information to the vehicle security node.

19. A method comprising:
receiving, by a security system of a premises, a signal from a vehicle comprising a vehicle security device via a wireless link;
determining that the vehicle is leaving the premises by determining that a strength of the signal received from the vehicle comprising the vehicle security device is less than a threshold, wherein the threshold is greater than zero; and
transmitting, by the security system and to the vehicle security device, a message configured to prompt a user to indicate whether to arm the security system.

20. The method of claim 19, further comprising:
performing a training process to establish the threshold.

21. The method of claim 20, wherein the performing the training process comprises storing, as the threshold, a strength of a test signal transmitted from the vehicle security device while the vehicle is located at a first location.

* * * * *